United States Patent [19]

Ushijima et al.

[11] Patent Number: 4,674,342
[45] Date of Patent: Jun. 23, 1987

[54] LOAD CELL

[75] Inventors: Yasuhiro Ushijima; Tohru Kitagawa; Sadao Ohyoshi, all of Mishima; Yoshihisa Nishiyama, Sunto, all of Japan

[73] Assignee: Tokyo Electric Co., Ltd., Tokyo, Japan

[21] Appl. No.: 767,773

[22] Filed: Aug. 20, 1985

[30] Foreign Application Priority Data

Aug. 21, 1984 [JP] Japan .................. 59-173564

[51] Int. Cl.⁴ .......................... G01L 1/22; G01L 1/26
[52] U.S. Cl. ................... 73/862.65; 177/229; 73/862.63
[58] Field of Search .............. 73/765, 766, 862.63, 73/862.65, 862.66, 862.67; 338/3; 177/211, 229

[56] References Cited

U.S. PATENT DOCUMENTS 4,196,784 4/1980 Suzuki et al. .............. 73/862.65 X

Primary Examiner—Charles A. Ruehl
Attorney, Agent, or Firm—Oblon, Fisher, Spivak, McClelland & Maier

[57] ABSTRACT

A load cell has a span resistor hole for enclosing a span resistor that is provided on the beam body, so that the span resistor may be free from the influence of environmental factors such as temperature and moisture and thus can be satisfactorily protected. The span resistor hole is located in a deformation-proof portion of the beam body, whereby the span resistor is not exposed to external mechanical force.

6 Claims, 5 Drawing Figures

LOAD CELL

FIELD OF THE INVENTION AND RELATED ART STATEMENT

This invention relates to a load cell for measuring the weight of a load on the basis of the conversion of mechanical strain on a beam body caused by the load into an electrical signal.

In general, the load cell comprises a beam body provided with a plurality of interbridged strain gages mounted on it and measures the weight of a load applied to the beam body by the use of the change of electrical resistance of the interbridged strain gages.

Such load cells are required to have a high degree of accuracy. Thus, it is necessary to maintain the span (sensitivity=change in output caused by a certain value of input) at a certain regular value. In the prior art, however, a span resistor which regulates the span is attached to the beam body simply protected with a coating such as Si. The span resistor if protected in this manner cannot be satisfactorily protected against external factors, and is subjected to external mechanical force, along with environmental influences such as moisture temperature and the like with consequent variation in the span.

OBJECT AND SUMMARY OF THE INVENTION

It is an object of the invention to provide a load cell installed with a span resistor which is satisfactorily protected against exterior factors, that is, free from exterior mechanical force and environmental influence such as temperature.

Another object is to provide a load cell of the construction that a span resistor hole for enclosing a span resistor is provided in the beam body, whereby the span resistor is well protected against external factors, and thus free from the influence of external mechanical force and environmental parameters such as temperature.

DETAILED DESCRIPTION OF PREFERRED EMBODIMENTS

Figure 1:
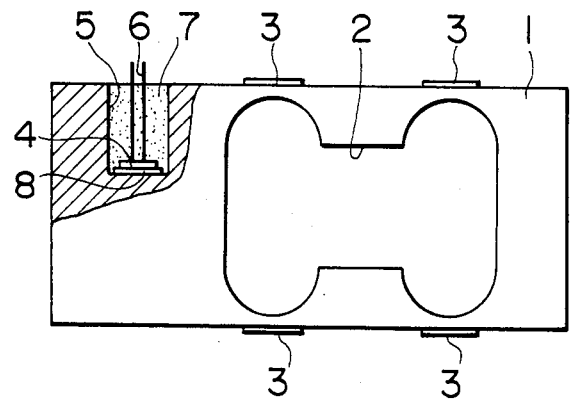
FIG. 1 is an elevational view of a first embodiment of the invention.
Figure 2:
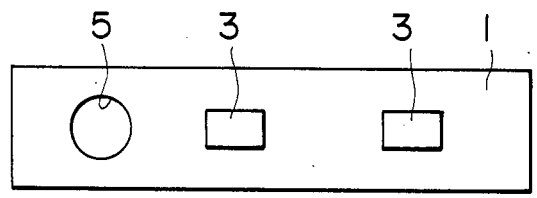
FIG. 2 is a plan view of the same.

Referring now to FIGS. 1 and 2, the first embodiment of the invention will be described below. A reference character 1 designates a rectangular beam body provided with a H-shaped hole and installed with four strain gages 3 opposite to the four ends of the hole, respectively. The strain gages 3 are electrically interbridged. The beam body 1 has its left end fixed and the right end free. At the free end, a load to be weighed is applied, and the weight is determined on the basis of the change of electrical resistance of the strain gages 3.

The span resistor 4 is installed in the load cell in an exclusive holes 5 (referred to as span resistor hole hereinafter) formed near the fixed end of the beam body 1. The span resistor 4 is disposed at the bottom of the span resistor hole 5, which may be plugged with a material adhesive or coating, with the lead wires 6 of th span resistor 4 going out from there. The span resistor 4 may be secured directly to the bottom of the span resistance hole 5, or may preferably be secured through a intermediator 8 to prevent any effects which may be caused by any possible unevenness of the bottom of the span resistance hole. It is useful that the intermediator 8 be of the same material as that of beam body 1 thereby having similar characteristics such as thermal conductivity.

The span resistor can be protected against exterior factors by enclosing the span resistor hole 5 as in the above embodiment.

Figure 3:
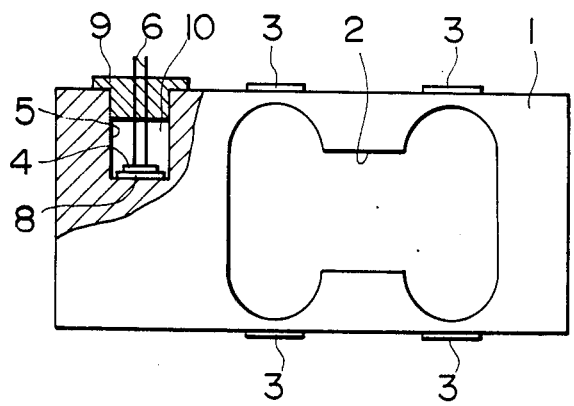
FIG. 3 is an elevational view of a second embodiment of a invention.

The first embodiment mentioned above is protected only by plugging the span resistance hole with an adhesive or the like. To provide greater protection against moisture, the second embodiment of the invention as shown in FIG. 3 is so constructed that a span resistor hole 5 which has received a span resistor 4 is sealed with a stopper 9 to improve the seal. For removing any possible effects of the remaining air in the space 10 between the span resistor 4 and stopper 9 in the second embodiment, the air may be replaced with an inert gas or oxidizing inhibiting gas, preferably nitrogen gas.

Figure 4:
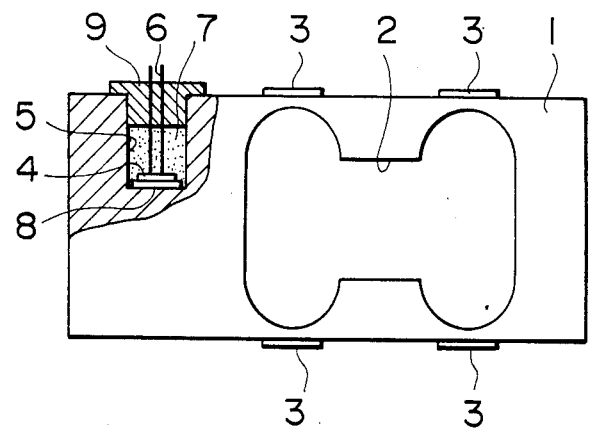
FIG. 4 is an elevational view of a third embodiment of the invention.

FIG. 4 shows the third embodiment of the invention, in which the span resistor hole 5 is plugged with filler 7 over the span resistor disposed on the bottom of it, and then sealed with a stopper 9.

Figure 5:
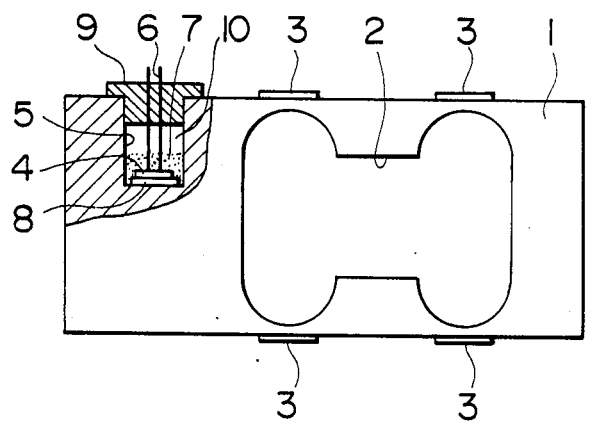
FIG. 5 is an elevational view of a fourth embodiment of invention.

In FIG. 5 is shown the fourth embodiment of the invention, in which the span resistor hole 5 is plugged with a filler 7 and sealed with a stopper 9, and a suitable gas such as nitrogen is used to fill in the defined space 10 between the filler 7 and the plug 9.

The third and fourth embodiments described above each have increased protection or improved tightness for the span resistor 4, which is consequently not subjected to effects of external mechanical force nor environmental factors such as moisture.

The second and fourth embodiments are installed with a stopper 9, which is secured fixedly by forced drive, soldering or screwing, and is provided at the center with through holes through which lead wires from the span resistor 4 may pass and, if desired, a hermetic terminal may be mounted in each through hole for troubleless external connection.

We claim:

1. A load cell for determining the weight of load applied to a beam body, comprising:

a rectangular beam body having a substantially H-shaped opening therein;

a means for fixing one end of said beam body and for applying a load to that end which is not fixed;

a plurality of strain gages fixed to the top and bottom surfaces of said beam body which vary in electrical resistance in response to the load placed upon said beam body;

a span resistor mounted in said beam body in a span resistor hole formed therein wherein, said span resistor hole is at that end of said beam body that is fixed and is formed in the direction of the load which is placed on said beam body; and an intermediate mounting layer interposed between said span resistor and the bottom of said span resistor hole wherein said intermediate mounting layer has the same thermal conductivity as the material in said beam body.

2. A load cell defined in claim 1 wherein said span resistor is enclosed in said span resistor hole by filling said span resistor hole with a coating or adhesive material.

3. A load cell defined in claim 1 wherein said span resistor hole is enclosed with a stopper.

4. A load cell defined in claim 3 wherein said span resistor hole is filled with an inert gas.

5. A load cell defined in claim 3 wherein said span resistor hole is enclosed with a filler.

6. A load cell defined in claim 3 wherein said span resistor hole is enclosed with a filler and inert or oxidizing inhibiting gas.

* * * * *